United States Patent
Ledet et al.

(10) Patent No.: US 7,069,841 B2
(45) Date of Patent: Jul. 4, 2006

(54) STEAM SHRIMP COOKER

(75) Inventors: Brent A. Ledet, Jefferson, LA (US); Kyle C. Bailey, River Ridge, LA (US); Christopher L. Manger, Metairie, LA (US); Darren P. McDonough, Metairie, LA (US); Kevin L. Gremillion, River Ridge, LA (US); Daniel W. Grisbaum, Westwego, LA (US)

(73) Assignee: Laitram, L.L.C., Harahan, LA (US)

( * ) Notice: Subject to any disclaimer, the term of this patent is extended or adjusted under 35 U.S.C. 154(b) by 394 days.

(21) Appl. No.: 10/248,776

(22) Filed: Feb. 17, 2003

(65) Prior Publication Data

US 2004/0159245 A1    Aug. 19, 2004

(51) Int. Cl.
*A47J 37/08* (2006.01)

(52) U.S. Cl. .............................. 99/386; 99/404; 99/407; 99/443 C; 99/477

(58) Field of Classification Search .................. 99/386, 99/443 C, 404, 407, 516, 330, 477; 198/406, 198/404, 813, 816
See application file for complete search history.

(56) References Cited

U.S. PATENT DOCUMENTS

| | | | |
|---|---|---|---|
| 3,491,679 A | 1/1970 | Kelly | 99/331 |
| 3,880,068 A | 4/1975 | Goodale | 99/478 |
| 3,908,533 A | 9/1975 | Fagerstrom et al. | 99/386 |
| 3,982,481 A | 9/1976 | Console et al. | 99/477 |
| 4,556,572 A | 12/1985 | Kaufman, Jr. et al. | 426/289 |
| 4,582,047 A | 4/1986 | Williams | 126/369 |
| 4,862,794 A | 9/1989 | Lapeyre et al. | 99/443 C |
| 4,887,524 A | 12/1989 | Ellis-Brown | 99/443 C |

(Continued)

FOREIGN PATENT DOCUMENTS

JP    2001-198013 A    7/2001

OTHER PUBLICATIONS

"Garroutte Pure Steam Blanching Systems" Brochure, Garroutte Corp., date unknown.

*Primary Examiner*—Reginald L. Alexander
(74) *Attorney, Agent, or Firm*—James T. Cronvich

(57) ABSTRACT

A steam cooker for cooking foodstuffs, especially shellfish such as shrimp, in a continuous cooking process in a pure saturated-steam environment at 100° C. and atmospheric pressure. The cooker comprises a cooking chamber covered by an enclosure movable between a raised position admitting access to the cooking chamber and a lowered cooking position. A conveyor transports shrimp from a feed tank, through an entrance opening, and into an upper cooking region of the cooking chamber where the shrimp are cooked. The conveyor deposits cooked shrimp into a discharge race through an exit for downstream processing. Hydrostatic seals formed at the entrance and exit and between the bottom rim of the enclosure and a water-filled trough bounding the cooking chamber prevent steam from escaping at those places. One or more ports through the floor of the cooking chamber are open to the atmosphere at vertical positions at or below the vertical positions of the hydrostatic seals and are of sufficient cross section to maintain atmospheric pressure within the cooking chamber. A feed mechanism including a paddle for controllably depositing shrimp in the feed tank onto the conveyor is mounted to the enclosure. Lifting the enclosure to the raised position lifts the feed mechanism away from the conveyor for ready access to the cooking chamber. A sampling device can be extended through the discharge race into the cooking chamber to sample cooked shrimp for quality just as they exit the upper cooking region.

30 Claims, 11 Drawing Sheets

U.S. PATENT DOCUMENTS

| | | | |
|---|---|---|---|
| 4,918,999 A | 4/1990 | Wenshau et al. | |
| 4,937,090 A | 6/1990 | Bichel | 426/509 |
| 4,942,810 A | 7/1990 | Zittel et al. | 99/477 |
| 4,949,629 A * | 8/1990 | Leary et al. | 99/386 |
| 5,014,679 A * | 5/1991 | Childs et al. | 126/21 A |
| 5,072,663 A | 12/1991 | Ellis-Brown | 99/331 |
| 5,156,873 A | 10/1992 | Skrmetta | 426/510 |
| 5,184,538 A | 2/1993 | Ledet | 99/331 |
| 5,289,759 A * | 3/1994 | Hufford | 99/330 |
| 5,410,951 A | 5/1995 | Ledet et al. | 99/443 C |
| 5,570,626 A | 11/1996 | Vos | 99/404 |
| 5,609,095 A | 3/1997 | Lemke et al. | 99/468 |
| 5,615,606 A | 4/1997 | Vos | 99/352 |
| 5,664,482 A | 9/1997 | Graham et al. | 99/330 |
| 5,666,876 A | 9/1997 | Vos | 99/443 C |
| 5,960,703 A | 10/1999 | Jara et al. | 99/331 |
| 6,009,798 A | 1/2000 | Ledet et al. | 99/443 C |

* cited by examiner

US 7,069,841 B2

STEAM SHRIMP COOKER

BACKGROUND OF INVENTION

The invention relates to apparatus for cooking raw product, such as shrimp and other shellfish, and, more particularly, to a steam cooker for cooking shrimp continuously transported by a conveyor through a steam-filled cooking chamber.

Cooking shrimp and other shellfish in a continuous cooking process is well known. In cooking shrimp, for instance, raw, uncooked shrimp in a feed tank are deposited on an endless conveyor belt that lifts the shrimp out of the tank into and through a cooking compartment in which the shrimp are cooked. At the exit end of the cooking compartment, the cooked shrimp drop from the conveyor belt for further processing.

The benefits of cooking shrimp and other products in a pure saturated steam environment at 100° C. and atmospheric pressure are also known. But to yield maximum benefits, the steam-filled cooking chamber must be free of air currents and unintended steam leaks that disturb the pure saturated steam environment in the cooking compartment by contaminating it with air. Adequate sealing of the cooking chamber is especially difficult in a cooker with a conveyor continuously transporting product into and out of the cooking compartment.

It is also important that cookers be easy to clean and service. Often a removable housing covers the cooking compartment. The cover is raised to admit access to the cooking compartment. But, when the cover is lowered during the cooking process, the interface between the cover and the rest of the cooker is a prime source of steam leaks. Rubber seals are used to prevent these leaks, but are subject to wear over time.

Thus, there is a need for an easy-to-clean steam cooker capable of maintaining a pure steam cooking environment for cooking product in a continuous, high-volume cooking process.

SUMMARY OF INVENTION

These needs and others are satisfied by a steam cooker having features of the invention. In one version, the cooker comprises a cooking chamber having an entrance at a first end and an exit at a second end. A conveyor transports shrimp through the entrance and into an upper cooking region of the cooking chamber and deposits the shrimp for discharge through the exit. An open-bottom enclosure covers the upper cooking region of the cooking chamber. A steam outlet emits steam into the cooking chamber. A first hydrostatic seal is formed between the enclosure and the cooking chamber to prevent steam from escaping at the interface between the cooking chamber and the enclosure. A second hydrostatic seal is formed at the entrance to prevent steam from escaping through the entrance. A third hydrostatic seal is formed at the exit to prevent steam from escaping through the exit. A port leading from the cooking chamber opens to the atmosphere at a vertical position at or below the vertical positions of the hydrostatic seals. The cross section of the port is sufficient to maintain atmospheric pressure in the cooking chamber.

According to another aspect of the invention, a cooker for cooking shrimp at atmospheric pressure comprises a cooking chamber defined by a bottom floor and a top enclosure open at its bottom. Continuous side walls of the enclosure terminate at a bottom rim. A steam outlet emits steam into the cooking chamber. A water-filled trough bounds the cooking chamber. The bottom rim of the enclosure can be positioned at a level below the level of the water in the trough to form a first hydrostatic seal. A water-filled feed tank at an entrance end of the cooker holds a supply of uncooked shrimp. A conveyor transports uncooked shrimp out of the feed tank and into the cooking chamber through an opening at its entrance end. The level of the water in the feed tank is above the level of the opening to form a second hydrostatic seal. A covered discharge race at the exit end of the cooking chamber has a flow of water into which shrimp cooked in the cooking chamber are deposited by the conveyor. A flap extending into the discharge flow forms a third hydrostatic seal. A port leading from the cooking chamber opens to the atmosphere at a vertical position at or below the vertical positions of the hydrostatic seals to maintain atmospheric pressure in the cooking chamber.

According to another aspect of the invention, a cooker for cooking shrimp at atmospheric pressure comprises a cooking chamber with an upper cooking region and a largely closed bottom supported in a frame. A conveyor transports shrimp into and through the upper cooking region. A steam outlet emits steam into the cooking chamber. An enclosure is formed by a top from which side walls extend to define an open-bottom enclosure with a continuous bottom rim. A water-filled trough bounds the cooking chamber at a vertical position below the upper cooking region. The trough is sized to receive the bottom rim of the enclosure below the level of water in the trough to form a hydrostatic seal between the cooking chamber and the enclosure. A port leading from the cooking chamber opens to the atmosphere at a vertical position at or below the vertical position of the hydrostatic seal. The cross section of the port is sufficient to maintain atmospheric pressure in the cooking chamber.

In still another version, a shrimp cooker comprises a cooking chamber with a floor and an upper cooking region supported in a frame. A steam outlet emits steam into the cooking chamber. A conveyor transports shrimp into and through the upper cooking region of the cooking chamber. An enclosure has a top from which side walls extend to form a continuous bottom rim defining an open bottom. A water-filled trough has a bottom and opposite inner and outer side walls. The trough, which is sized to receive the bottom rim of the enclosure, bounds the cooking chamber at a vertical position below the upper cooking region. A lift mechanism attached to the enclosure moves the enclosure between a raised position admitting service access to the cooking chamber and a lowered position covering the upper cooking region of the cooking chamber. In the lowered position, the bottom rim of the enclosure is below the level of water in the trough, but separated from the bottom of the trough by a gap. Thus, a hydrostatic seal is formed between the cooking chamber and the enclosure.

In another aspect of the invention, a shrimp cooker includes a cooking chamber supported in a frame. A feed tank disposed at an infeed end of the cooking chamber holds a supply of uncooked shrimp to be cooked in the cooking chamber. A conveyor transports uncooked shrimp out of the feed tank, into the cooking chamber, and out of the cooking chamber at a discharge end as cooked shrimp. An enclosure is sized to cover the cooking chamber. A lift mechanism attached to the enclosure moves the enclosure between a lowered position covering the cooking chamber and a raised position admitting service access into the cooking chamber. A feed mechanism mounted to the enclosure includes a paddle for depositing uncooked shrimp held in the feed tank onto the conveyor at a controlled rate. Because it is mounted to the enclosure, the feed mechanism is liftable along with the enclosure.

In a further version, a cooker for steam-cooking shrimp comprises a cooking chamber extending from an infeed end to a discharge end. A steam outlet emits steam into the cooking chamber. A conveyor transporting uncooked shrimp from the infeed end, through the cooking chamber, and to the discharge end. A discharge race at the discharge end of the cooking chamber has a water flow into which shrimp cooked in the cooking chamber are dropped by the conveyor. The discharge race extends from a first room into a second room separated from the first room by a wall. A sampling device can be extended through the race above the water flow from the second room and into the first room.

In yet another version, a steam cooker for continuously cooking shrimp in a saturated steam environment at 100° C. and atmospheric pressure comprises a cooking chamber supported in a frame. The cooking chamber includes an upper cooking region and a bottom floor. A water-filled tank at a first end of the cooking chamber holds a supply of uncooked shrimp. An infeed port is disposed between the cooking chamber and the feed tank below the level of the water in the tank to form a hydrostatic seal at the infeed port. The cooking chamber is bounded by a water-filled trough. An open-bottom enclosure includes a top with four side walls terminating in a bottom rim. The enclosure is attached to a lift mechanism, which moves the enclosure between a raised position admitting access to the cooking chamber and a lowered position in which the bottom rim of the enclosure resides in the trough below the level of the water in the trough. A hydrostatic seal is formed between the enclosure and the cooking chamber in the trough. A conveyor is arranged to continuously transport uncooked shrimp out of the feed tank and up into and through the upper cooking region of the cooking chamber. The conveyor deposits shrimp cooked in the cooking region into a discharge race. The discharge race, at the second end of the cooking chamber, provides a stream of flowing water to carry the cooked shrimp from the cooker. A cover flap extending into the flow stream in the discharge race forms a hydrostatic seal. A feed mechanism, attached to the enclosure at the first end of the cooking chamber, includes a paddle that extends into the feed tank when the enclosure is in the lowered position. The paddle is operable to sweep uncooked shrimp in the feed tank onto the conveyor at a controllable rate. A steam supply system includes a control valve and steam outlets to inject pure saturated steam into the cooking chamber. A thermal sensor is disposed in the cooking chamber below the upper cooking region. The sensor is operable with the control valve to regulate the supply of steam into the cooking chamber to maintain a steam temperature of 100° C. in the upper cooking region. A port leads from the cooking chamber and opens to the atmosphere at a vertical position at or below the vertical positions of the hydrostatic seals. The port has a cross section sufficient to maintain atmospheric pressure in the cooking chamber.

BRIEF DESCRIPTION OF DRAWINGS

These and other features, aspects, and advantages of the invention are better understood by reference to the following description, appended claims, and accompanying drawings in which:

DETAILED DESCRIPTION

Figure 1:
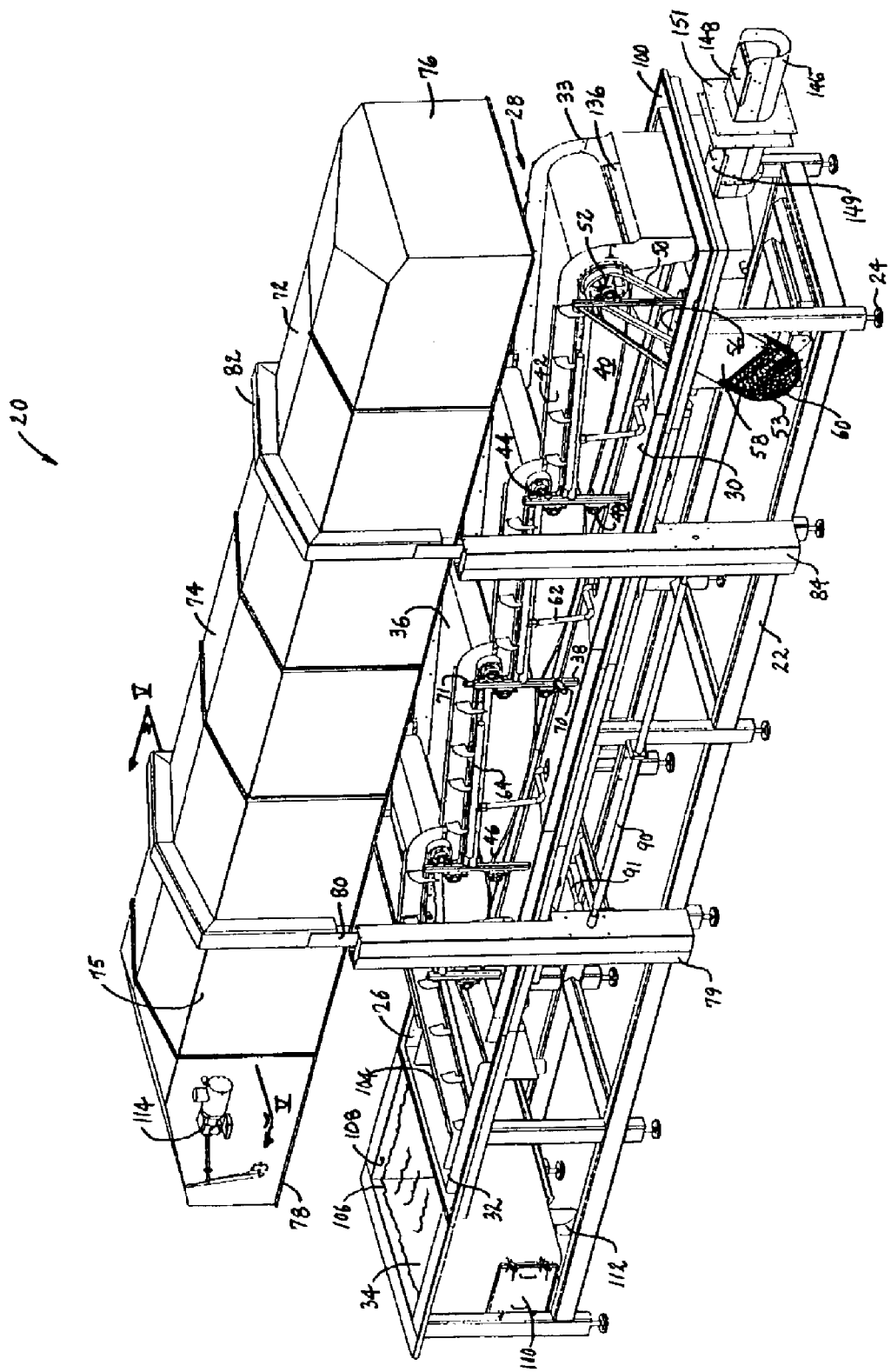
FIG. 1 is an isometric view of a steam cooker embodying features of the invention in which the enclosure is shown in a raised position revealing the cooking chamber.
Figure 2:
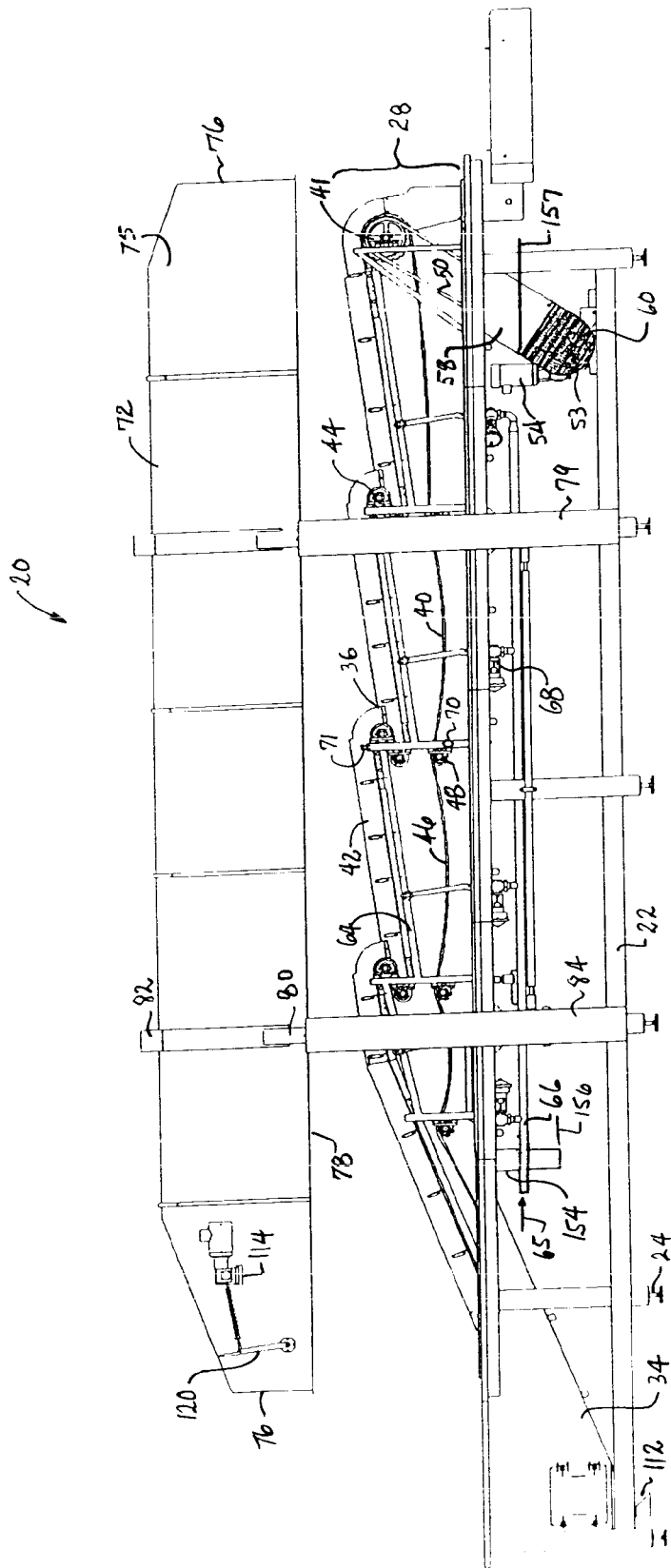
FIG. 2 is a side elevation view of the cooker of FIG. 1.
Figure 3:
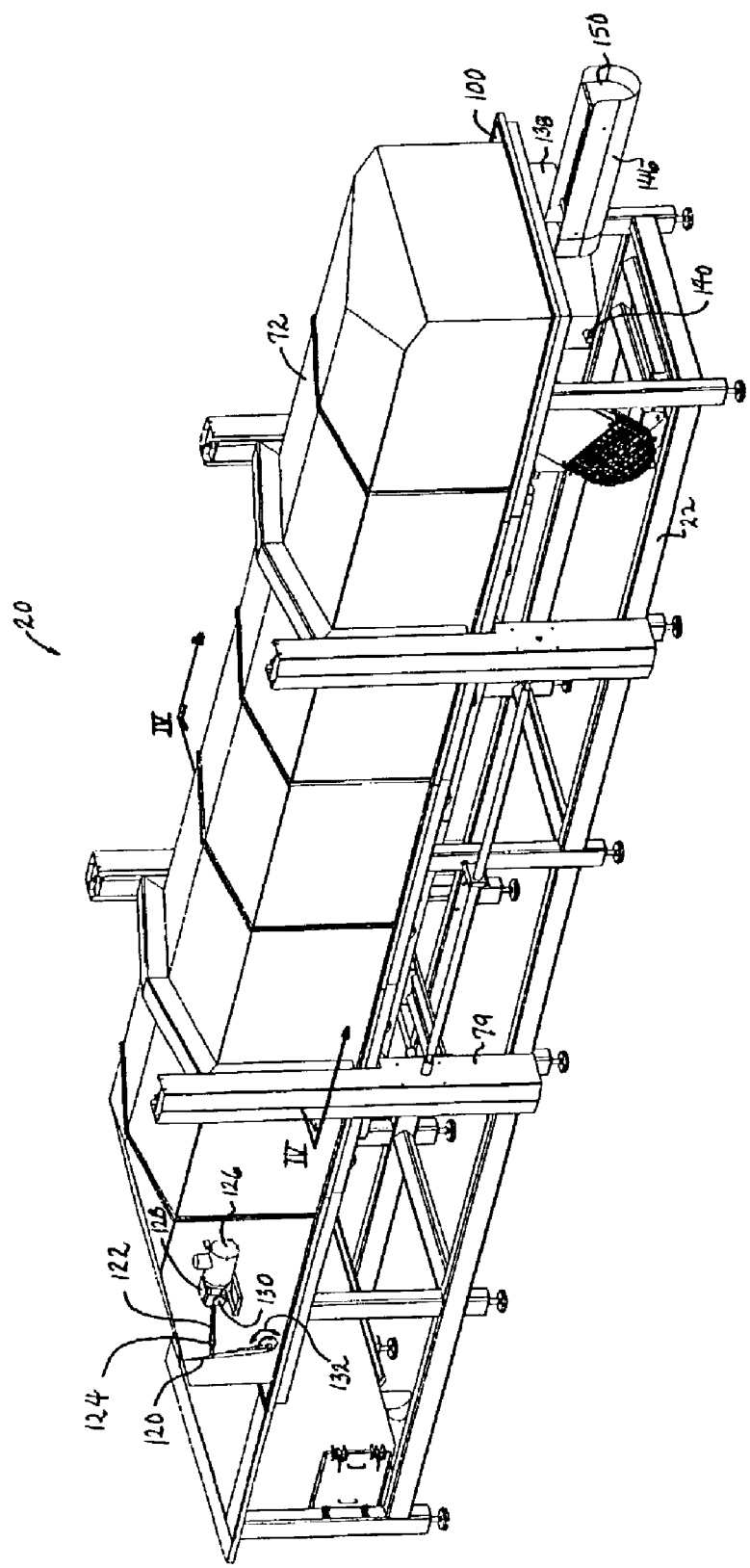
FIG. 3 is an isometric view of the cooker of FIG. 1, in which the enclosure is in a lowered position.

A steam cooker embodying features of the invention is shown in FIGS. 1–3. The cooker 20 includes a frame 22 with leveling feet 24. The frame supports a cooking chamber 26 that has an upper cooking region 28 and a bottom floor 30. The chamber extends from a first entrance end 32 to a second exit end 33. A feed tank 34 is supported in the frame at the entrance end of the cooking chamber. The feed tank is filled with water and holds a supply of uncooked shrimp.

A conveyor 36, such as a belt conveyor, extends from the feed tank and through the upper cooking region of the cooking chamber. The conveyor transports shrimp out of the feed tank and into the cooking chamber through an entrance at the first infeed end of the chamber. The conveyor carries the shrimp up into the upper cooking region. The conveyor includes a conveyor frame 38 extending upward from the floor of the cooking chamber. A perforated conveyor belt 40 Is driven by a sprocket drive system 41 at the exit end of the cooking chamber. Conveyor side rails 42 are also supported on the conveyor frame to confine the belt along the carryway. The carryway in this version is shown with three S-flips 44 at which the shrimp are dropped off the belt at the top of the S onto the belt as it exits the S. This repositions the shrimp to ensure even cooking, especially if the shrimp are densely packed or lying atop each other. The belt makes its way back from the drive sprocket system to the feed tank along a returnway 46 beneath the carryway. Return rollers 48 supported on the conveyor frame support the belt along the returnway. An idler sprocket system in the bottom of the feed tank returns the conveyor belt to the carryway from the returnway. The drive sprocket system is driven by a chain 50 that wraps around a sprocket 52 extending outward of the conveyor belt and a motor-driven sprocket 53 beneath the cooking chamber. A motor 54 drives the sprocket. The drive chain 50 extends through an opening 56 in the floor of the cooking chamber. A chain guard 58 extends downward from the floor of the cooking chamber and covers a portion of the chain. The chain guard is closed on its sides and open at both ends. A grille 60 covers the sprocket 53 and chain at its coupling to the motor shaft.

Figure 4:
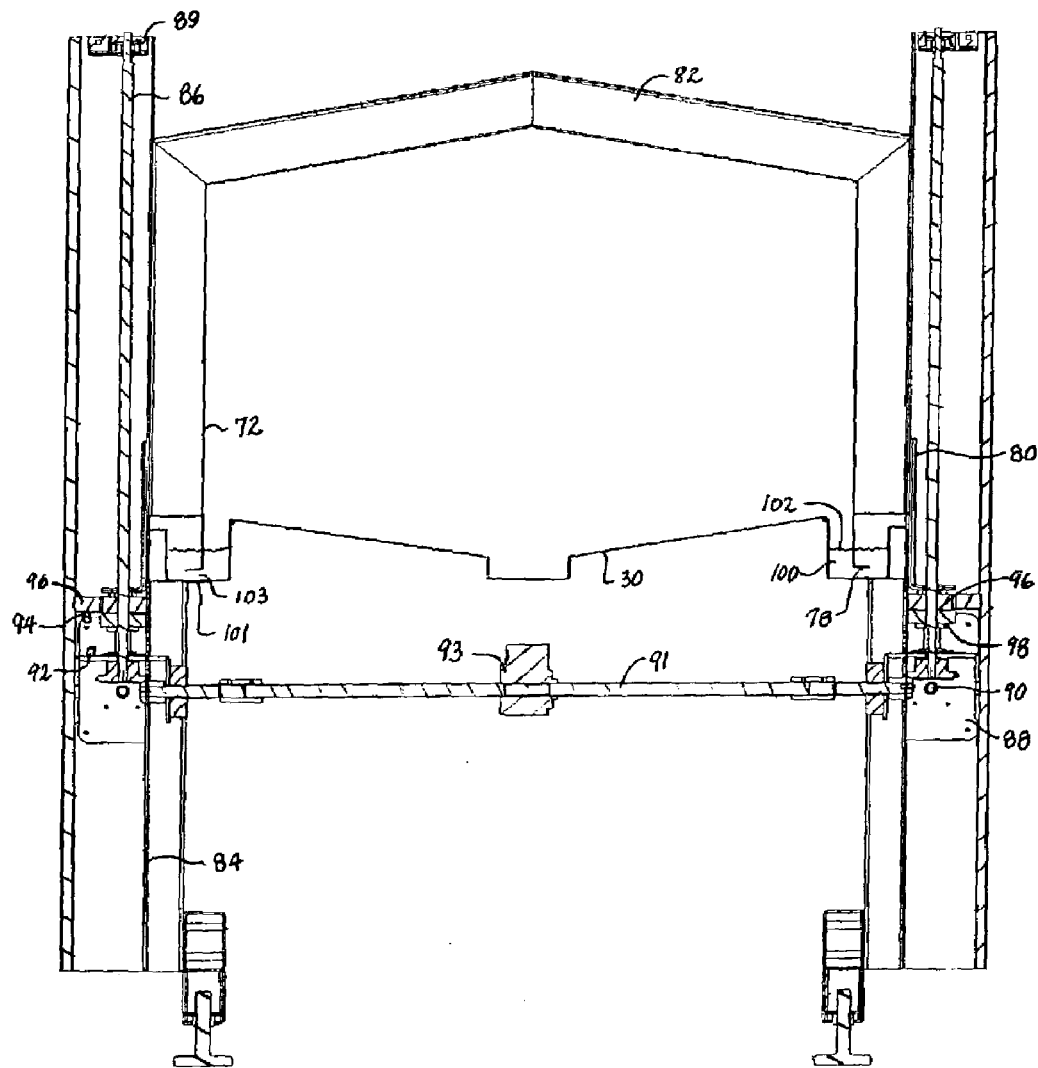
FIG. 4 is a cross section of the cooker taking along lines IV—IV of FIG. 3.

A network of steam pipes 62 with steam outlets 64 is also supported by the conveyor frame. The steam outlets are preferably positioned just beneath the belt carryway to inject steam directly through the perforated belt and into the shrimp. Steam 65 from a source of saturated steam enters an input pipe 66 and is controllably directed into the cooking chamber by steam control valves 68 situated just beneath the floor. The cooking chamber is equipped with a first temperature sensor 70 positioned in a transition region of the cooking chamber. In the transition region, which lies beneath the upper cooking region, the environment is a mixture of steam and air at a temperature below 100° C. In the upper cooking region, the environment is maintained as a pure saturated steam environment at 100° C. The first temperature sensor outputs a signal indicative of the temperature in the transition region. That signal is sent to a controller, such as a PC or a PLC (programmable logic controller), which controls the delivery of steam into the chamber through the control valves. Details and advantages of such a steam control system are given in U.S. Pat. No. 5,410,951, Apparatus and Method for Continuous High-Volume Steam Cooking, whose disclosure is incorporated herein by reference. For monitoring the actual temperature in the upper cooking region for reasons of quality control, a second temperature sensor 71 may be used. It should be recognized that the temperature of the upper cooking region could be maintained at temperatures below 100° C. as well. The cooking chamber is covered by an enclosure 72, which consists of a top 74, a pair of opposite side walls 75, and a pair of opposite end walls 76. The bottom of the enclosure is open and bounded by a continuous, flanged rim 78. The enclosure can be moved from a raised portion as shown in FIG. 1 to a lowered position as shown in FIG. 3. The raised position admits access to the cooking chamber for cleaning or service. In the lowered position, the enclosure covers the cooking chamber for normal operation. A motor-driven lift mechanism is mounted to the frame and to the enclosure. The lift mechanism includes four lifts 79 with brackets 80 attached to buttresses 82 on the enclosure. Each lift is covered by a housing 84. Inside each housing, as shown in FIG. 4, is a screw gear 86 extending from a gearbox 88 and terminating in a top bearing block 89. The gearbox includes meshing bevel gears: one attached to the lower end of the screw; another attached to the end of a drive shaft 90 leading to the gearbox of the other lift on the same side of the cooker. One of the two gearboxes on each side is driven directly from a lift motor 93 by a drive shaft 91, which terminates in a bevel gear inside the gear box. One of the lifts also includes a proximity sensor 92 used to detect a target 94, such as a magnetic target, attached to a platform 96, which is attached to the nut 98 of the screw gear. The bracket is also attached to the platform. When the target gets close enough to the proximity sensor, the sensor sends a signal or opens a switch to stop the lift motor. This determines the lowered position of the enclosure. A similar proximity sensor near the top of the lift can be used to define the raised position of the enclosure.

When the enclosure is in its lowered position, its bottom rim 78 is received in a water-filled trough 100 bounding the cooking chamber. The bottom rim in the lowered position sits below the water level 102 in the trough. In this way, a hydrostatic seal is formed in the trough at the interface of the enclosure and the cooking chamber. The seal prevents steam from leaking from the cooking chamber at the bottom rim of the enclosure. Preferably, the bottom rim of the enclosure is separated from the bottom 101 of the trough by a gap 103 to allow the water in the trough on both sides of the enclosure side walls to mix.

The conveyor enters the cooking chamber at the entrance end 32 through an infeed opening 104 from the feed tank. The water level 106 in the feed tank is maintained above the vertical level of the opening to form a hydrostatic seal at the entrance. The seal at the entrance prevents steam from escaping the cooking chamber through the infeed opening. Water inlets 108 pour water into the feed tank. The feed tank also includes an access door 110 to service and clean the tank and a drain pipe 112.

Figure 5:
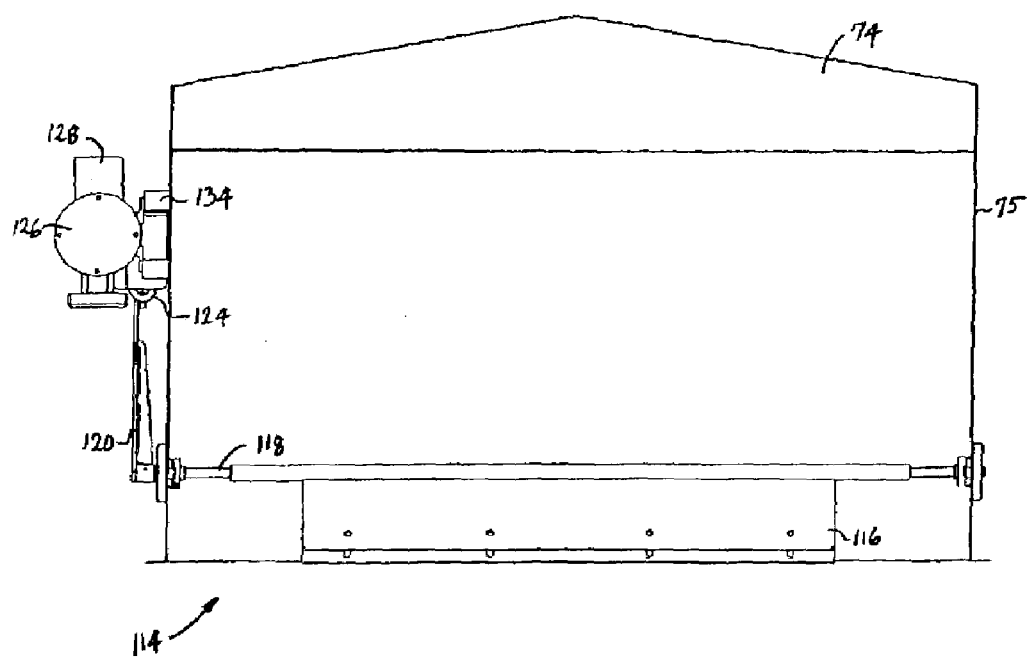
FIG. 5 is a partial view of the feed mechanism of the cooker viewed along lines V—V of FIG. 1.

Shrimp are deposited on the conveyor belt in a controlled manner by a feed mechanism 114 mounted to the enclosure at the infeed end of the cooker. The feed mechanism, shown in more detail in FIG. 5, includes a paddle 116 that extends across the conveyor belt. The paddle is secured to a rock shaft 118 journalled in the side walls 75 of the enclosure. A rocker arm 120 extends from one end of the rock shaft to a pivotal connection with one end of a drive arm 122. The drive arm includes a length adjuster 124. The other end of the drive arm is pivotally connected to a rotary drive train, including a speed reducer coupled to a motor 126. A drive converter 128 coupled to the speed reducer has an output rotary shaft coupled to a crank block 130 pivotally connected to the drive arm. The rotary drive train imparts a rocking motion to the paddle through the linkage comprising the arms 120 and 122 as indicated by double-headed arrow 132. The speed of the motor and the sweep angle of the paddle as determined by the length adjuster are used to control the rate of shrimp deposited onto the belt by the paddle. The rotary drive train is mounted to the enclosure on a mounting plate 134. Because the feed mechanism is mounted to the enclosure, it is lifted with the enclosure clear of the conveyor belt. This makes it easy to clean and repair the conveyor.

Figure 9:
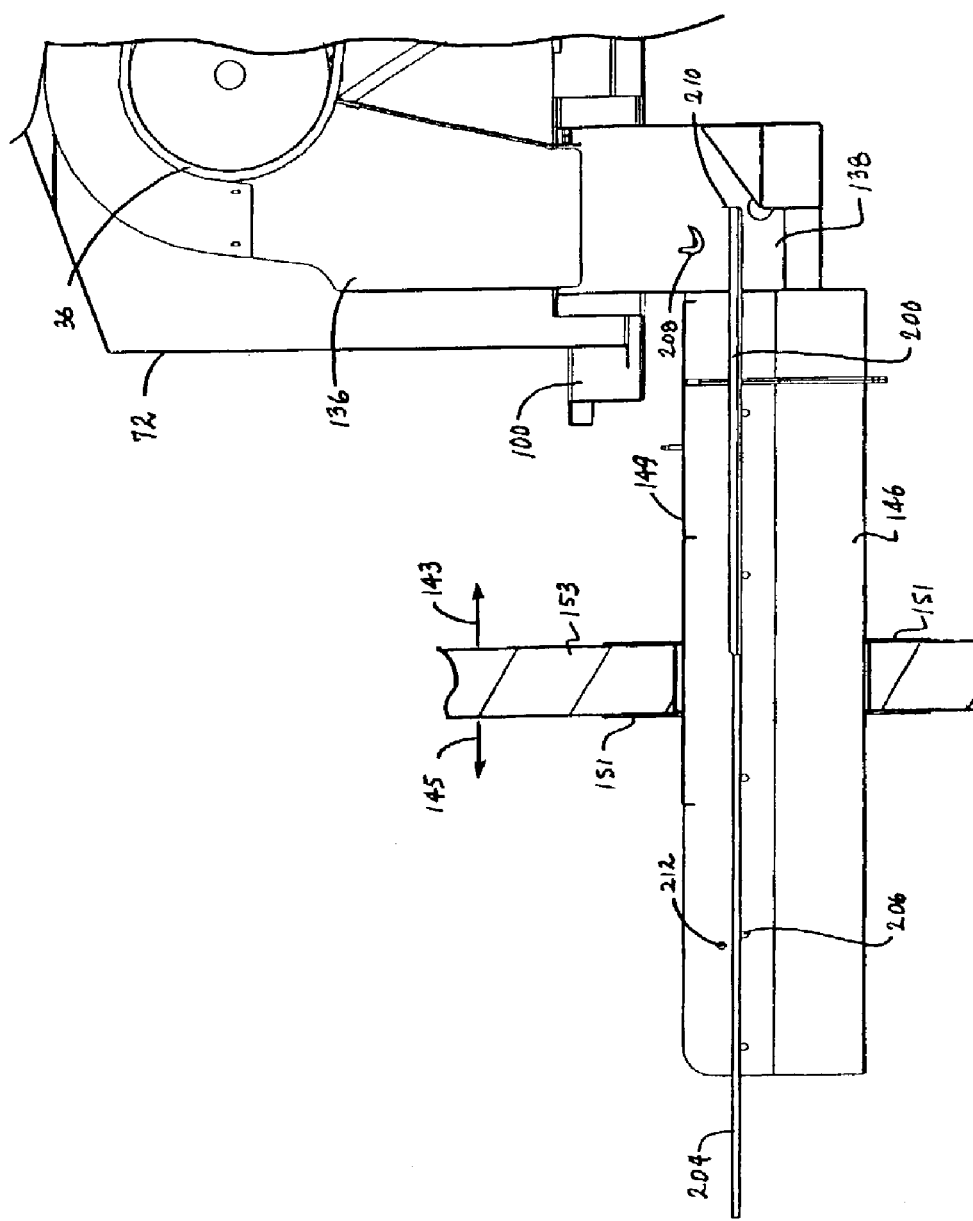
FIG. 9 is a cross section of the exit end of a cooker as in FIG. 8 taken along lines IX—IX.

After the shrimp are cooked in the upper cooking region of the cooking chamber, they fall off the exit end of the conveyor into a discharge chute 136 down to a discharge tank 138. (See also FIGS. 6 and 7.) Water flows into the discharge tank through outlets 140 at each side. Spreaders 142 convert the flow of water out of each outlet into a high-speed horizontal fan of water. The water is directed from each side of the discharge tank toward the middle. A triangular diverter 144 redirects the two flows toward a discharge race 146. The water, which is preferably cold to stop the cooking of the shrimp, washes the shrimp from the cooker through the race to a discharge station (not shown) for further processing. The discharge race includes covers 148, 149, preferably removable for access into the race and the discharge tank. An exit flap 150 is hinged to the exit cover 148 and extends into the discharge stream. In this way, a hydrostatic seal is formed at the discharge end of the cooker to prevent steam from escaping the cooking chamber through the exit and to keep air from infiltrating the cooking chamber. As shown in FIG. 9, the race with its removable cover is designed to extend through a wall 153 separating a low-risk zone 143, or room, in which the cooker and the feed tank with the raw shrimp are located from a high-risk zone 145, or room, often pressurized, in which the cooked shrimp are processed. Bulkhead plates 151, sandwiching the wall, support the race at the cutout in the wall for the race. In this way, contaminants from the low-risk zone are isolated from the high-risk zone.

Figure 8:
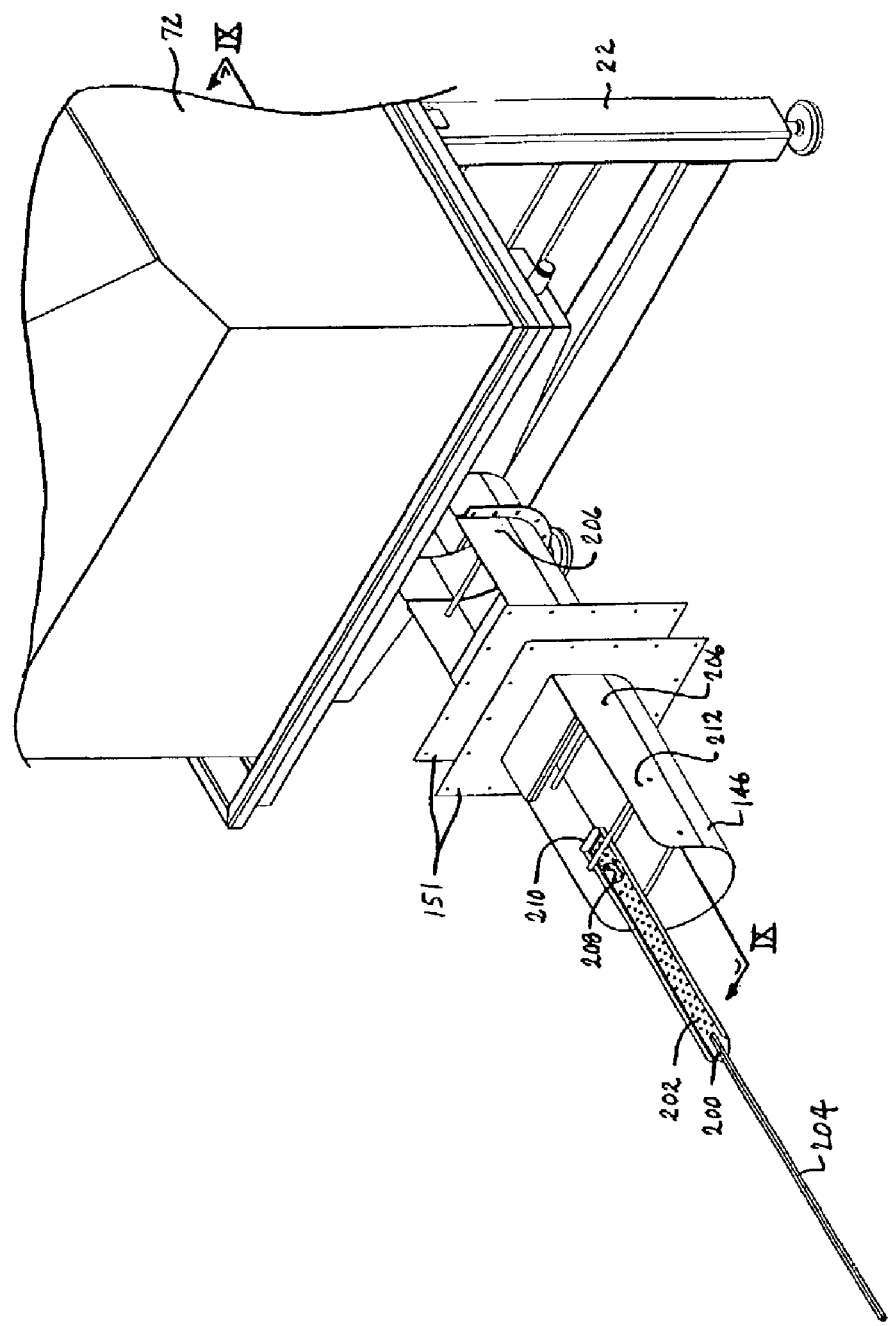
FIG. 8 is an isometric view of the exit portion of a cooker as in FIG. 1.

The removable cover allows access from the high-risk zone into the exit end of the cooker for quality monitoring without compromising the isolation. As shown in FIGS. 8 and 9, a sampling device 200 is used in sampling the quality of the cooked shrimp as they exit the upper cooking region of the cooking chamber before they drop into the chilling water in the discharge tank 138. The sampling device can be inserted from the high-risk zone into the interior of the cooker, which sits in the low-risk zone, without risk of contamination. The sampling device comprises a perforated sampling tray 202 attached to the end of a long handle 204.

When the exit cover and the attached flap are removed from the discharge race, the sampling device can be inserted through the race above the level of the flow stream from the high-risk zone, past the wall, and into the low-risk zone. The sampling device is slidingly supported on glide posts 206 spanning the width of the race. The posts support the sampling device above the stream in the race and guide the sampling device into the cooker. The glide posts also help maintain the shape of the race. Some of the cooked shrimp 208 dropping from the end of the conveyor 36 and through the discharge chute 136 are intercepted by the sampling tray on their fall into the discharge tank 138. The sampling tray can be retracted and the shrimp inspected. A lip 210 at the end of the sampling tray engages a stop post 212 that cooperates with a nearby glide post to retain the retracted sampling device in place. Although the sampling device was described as a manual device, it could alternatively be realized with a long-throw air cylinder or a conveyor belt traveling along the race.

Figure 6:
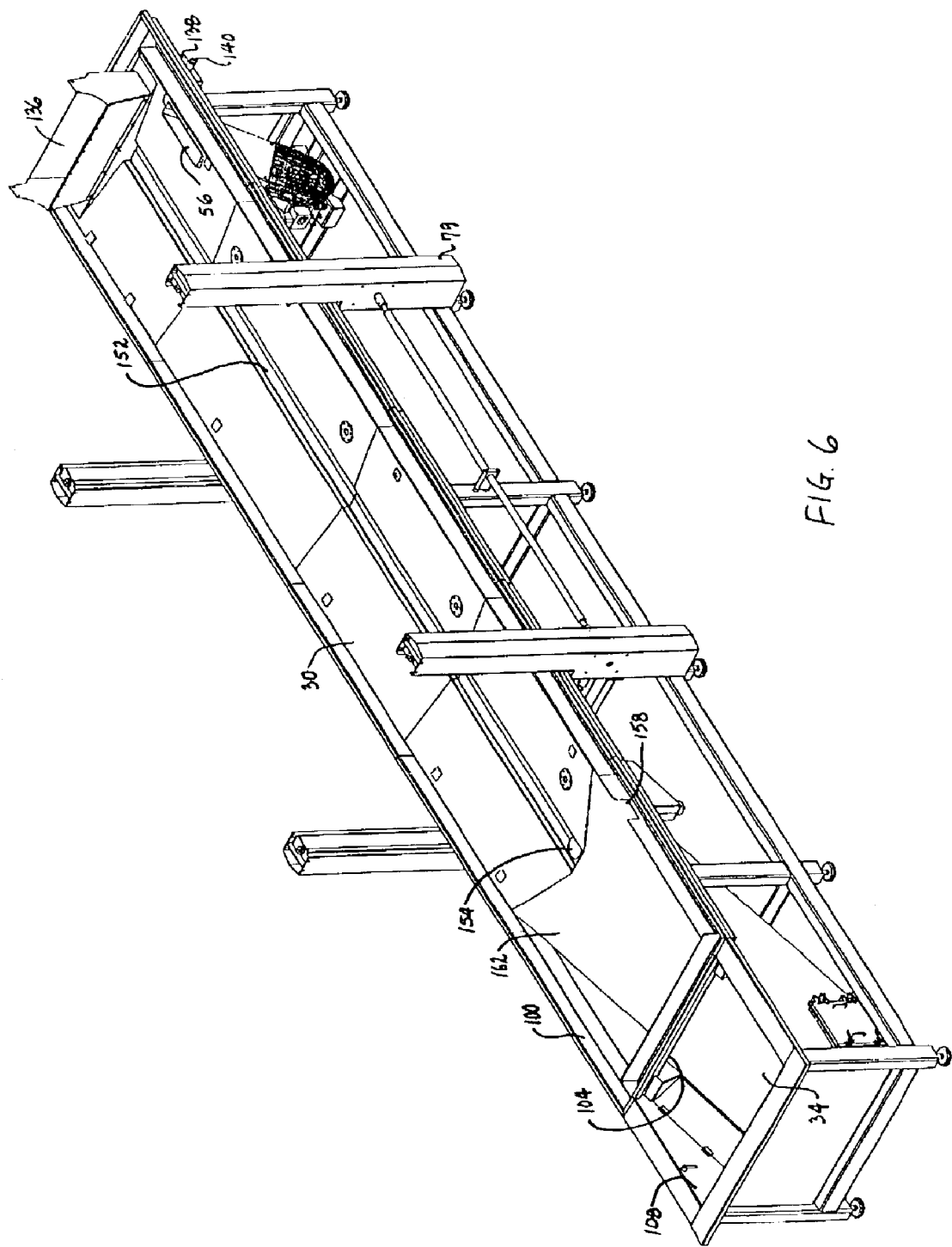
FIG. 6 is a top isometric view of the cooker of FIG. 1 with the enclosure and the conveyor removed for clarity.

As best shown in FIG. 6, the floor 30 of the cooking chamber is sloped on each side toward a central drain channel 152. The channel slopes slightly down from the exit end toward the entrance end at which a drain 154 is located. The opening 56 for the conveyor drive chain is formed in the floor near the exit end. The chain guard 58 and the drain pipe 154 extend downward from the floor of the cooking chamber. Their openings to the atmosphere are at vertical levels 156, 157 at or below the vertical levels of the hydrostatic seals at the entrance and exit and at the trough, as shown in FIG. 2. The openings of the ports are of sufficient cross-sectional area to maintain atmospheric pressure within the cooking chamber. In this way, the shrimp are cooked in the upper cooking region of the cooking chamber in a pure saturated-steam environment at 100° C. and atmospheric pressure.

Figure 7:
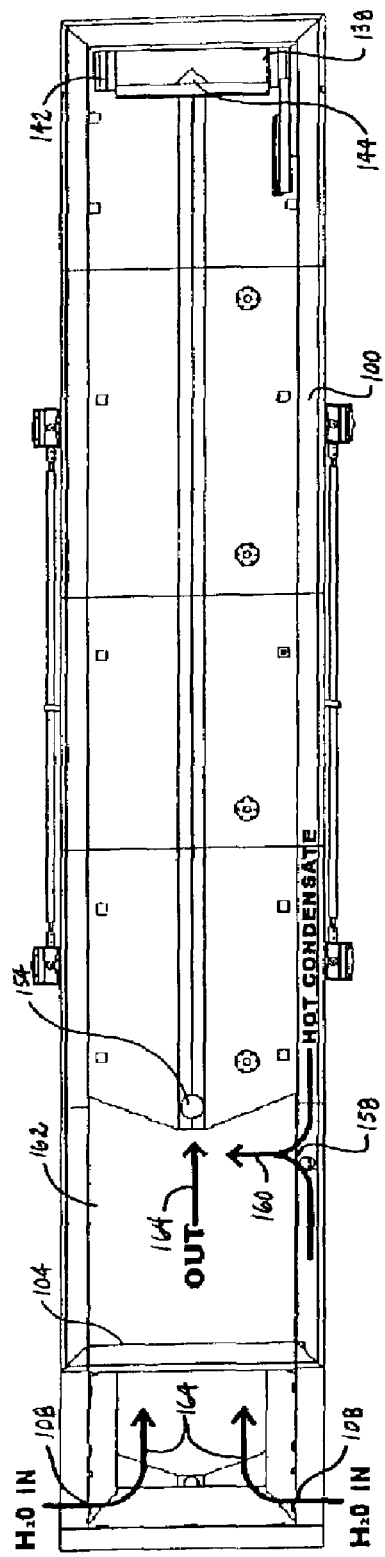
FIG. 7 is a top plan view of the cooker of FIG. 1 with the enclosure and the conveyor removed for clarity.

As shown in FIGS. 6 and 7, hot condensate that forms on the inside top and the end and side walls of the enclosure drips down the walls into the trough 100. An overflow opening 158 on the inside wall of the trough is provided to prevent water in the trough from spilling over the side of the cooker. The overflow water, indicated by arrow 160, flows through the overflow opening into a sloped portion 162 of the floor of the cooking chamber that supports the inclined portion of the conveyor in its path from the feed tank up into the upper cooking region of the cooking chamber. The water outlets 108 pump water into the feed tank 34 to maintain the hydrostatic seal at the entrance opening and to create a flow path, indicated by arrows 164, that forces the hot condensate toward the drain 154 in the floor of the cooking chamber. By preventing the hot condensate from spreading into the feed tank, the flow of water from the feed tank eliminates premature cooking of the shrimp.

Figure 10:
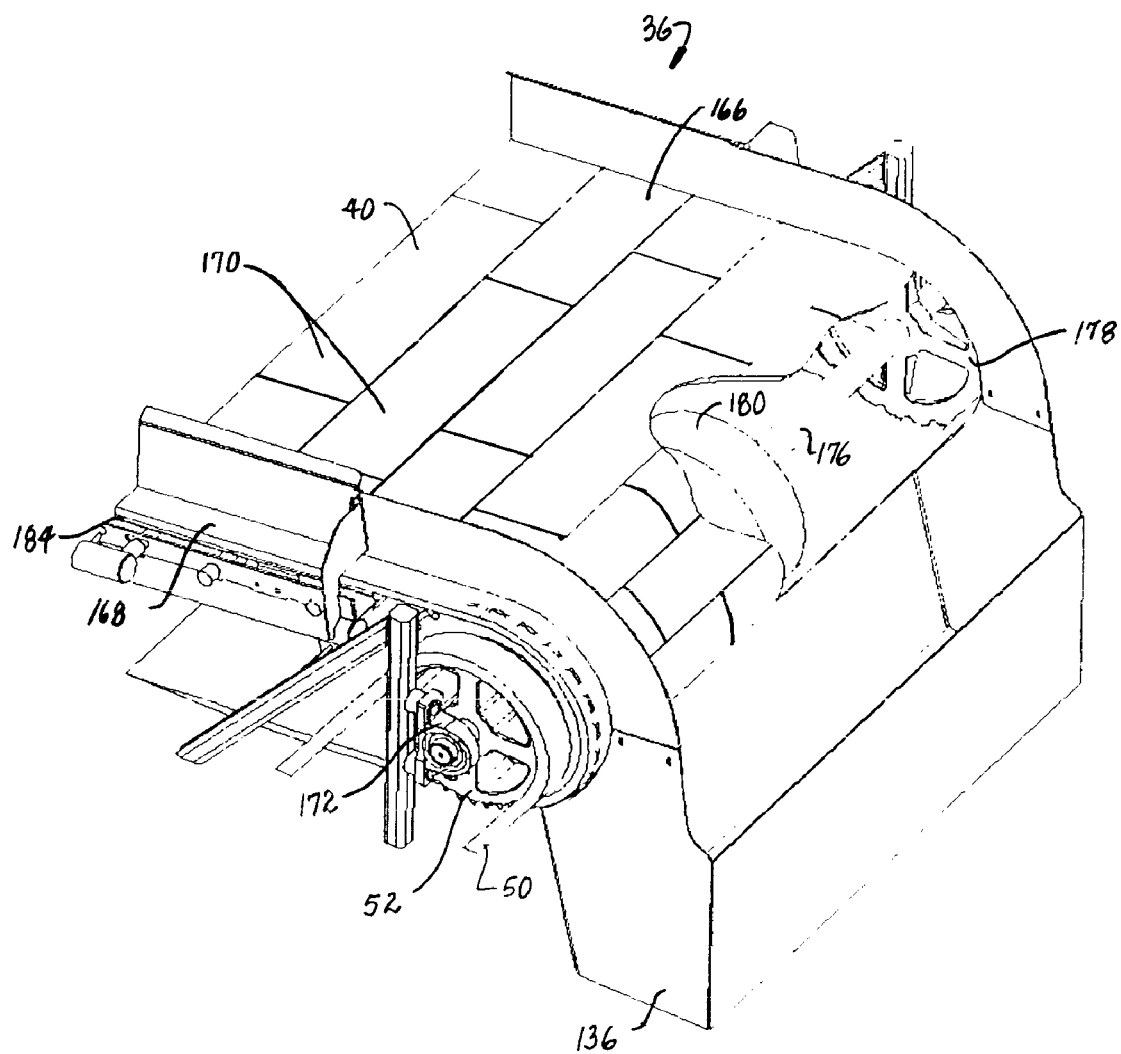
FIG. 10 is an isometric view, partly cutaway, of a portion of a belt conveyor usable with a cooker as in FIG. 1.

Details of the conveyor 36 are shown at the exit end of the cooker in FIG. 10. The conveyor belt 40 includes a modular plastic interior portion 166 flanked by roller chains 168. The interior portion is formed by a series of rows of belt modules 170 linked row to row by hinge pins, preferably made of stainless steel. The hinge pins extend and are welded to the roller chains at each side edge of the belt. Springs between the roller chain and the interior modules on each hinge pin hold the interior portion together as the modules expand and contract with changes in temperature. The belt modules are preferably perforated with sufficient open area to allow steam emitted from the steam outlets beneath the conveyor to penetrate the layer of shrimp carried on the belt. The main drive shaft 176, which is rotatably supported at its outermost ends in bearing blocks 172, is driven by the sprocket 52 driven by the drive chain 50. Roller chain drive sprockets 178 at each end of the shaft, but inside the drive sprocket 52 at that end, engage the roller chains at each edge of the conveyor to drive the belt. One or more rotating support drums 180 mounted on the shaft support the belt as it articulates about the shaft on its way to the returnway. Rollers on the roller chains roll along a rail 184 supported in the conveyor frame.

Figure 11:
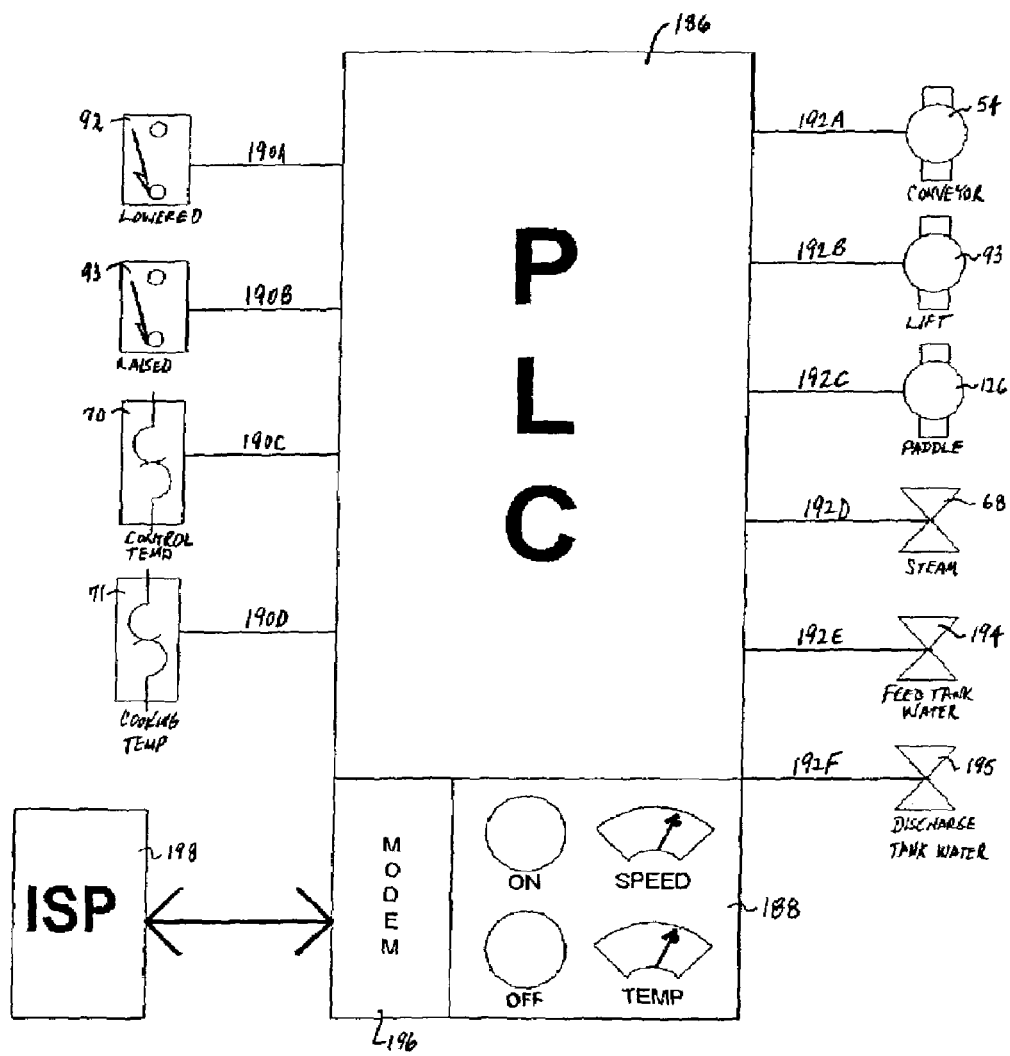
FIG. 11 is an electromechanical block diagram of a control system usable with a cooker as in FIG. 1.

A controller 186 usable with the cooker is shown in FIG. 11. The controller includes a PLC or a PC. ON, OFF, and other control pushbuttons, motor speed control knobs, and temperature, speed, and other meters can be realized discretely in hardware or virtually as part of a touchscreen display 188. The controller reads input signals on input lines 190A–D from limit switches 92, 93, which indicate whether the enclosure is in the lowered or raised positions, and from temperature sensors 70, 71. The controller sends output control signals over output lines 192A–F to control the conveyor motor 54, the lift motor 93, the paddle motor 126, the steam valves 68, a feed tank water valve 194, and a discharge tank water valve 195. Of course, these inputs and outputs represent just one possible control system. The controller could also have a modem 196 to allow remote monitoring and control of the cooker over a direct phone line to a remote site or via the Internet through an ISP (Internet Service Provider) 198.

The various aspects of the invention have been described in detail with respect to one main embodiment. But the invention is not limited to that embodiment. For example, one or more of the features may be modified, or entirely different embodiments may be provided, without departing from the invention. For instance, the exit from the cooking chamber need not include a discharge race. The cooked shrimp could be dropped directly onto another conveyor. Two ports, the chain guard port and the drain port, were shown open to the atmosphere just below the cooking chamber. But the drain port, for instance, could be connected directly to a drain line that does not open to the atmosphere for some distance. The limit switches for the lift mechanism could be magnetic, optical, or mechanical, for example. A single steam valve or multiple valves, one for each entry into the cooking chamber as shown in FIG. 2, could be used. And, although the invention was described in the context of cooking shrimp, it should be clear that other shellfish and even other food products could be cooked in a cooker having features of the invention. Thus, the present invention is not restricted to the particular embodiment described and illustrated in detail, but includes all embodiments and modifications that may fall within the scope of the claims.

What is claimed is:

1. A cooker for cooking shrimp at atmospheric pressure, the cooker comprising:

a cooking chamber extending from a first end to a second end and including an upper cooking region;

an entrance leading into the cooking chamber at the first end;

an exit from the cooking chamber at the second end;

a conveyor for transporting shrimp through the entrance and into the upper cooking region of the cooking chamber and depositing the shrimp for discharge through the exit;

an open-bottomed enclosure covering the upper cooking region of the cooking chamber;

a steam outlet for emitting steam into the cooking chamber;

a first hydrostatic seal formed between the enclosure and the cooking chamber to prevent steam from escaping at the interface between the cooking chamber and the enclosure;

a second hydrostatic seal formed at the entrance to prevent steam from escaping from the cooking chamber through the entrance;

a third hydrostatic seal formed at the exit to prevent steam from escaping from the cooking chamber through the exit;

a port leading from the cooking chamber and opening to the atmosphere at a vertical position at or below the vertical positions of the hydrostatic seals and having a cross section sufficient to maintain atmospheric pressure in the cooking chamber;

a motor disposed below the cooking chamber;

a chain drivingly engaged by the motor and extending into the cooking chamber to engage and drive the conveyor; and a chain guard extending downward from the cooking chamber and protectively covering a portion of the chain, wherein the chain guard forms the port.

2. A cooker as in claim 1 further comprising a drain pipe extending downward from and arranged to drain condensate and other liquid from the cooking chamber.

3. A cooker as in claim 1 further comprising a lift mechanism arranged to move the enclosure between a raised position providing access to the cooking chamber and a lowered position enclosing the upper cooking region and forming the first hydrostatic seal at the interface of the cooking chamber and the enclosure.

4. A cooker as in claim 1 further comprising a feed tank at the first end of the cooking chamber, wherein the feed tank is filled with water to a level covering the entrance to form the second hydrostatic seal.

5. A cooker as in claim 1 wherein the exit includes:

a covered discharge space having a stream of flowing water carrying cooked shrimp from the cooker to a discharge station; and a flap extending into the flowing stream to form the third hydrostatic seal.

6. A cooker as in claim 5 wherein the discharge race extends through a wall separating the cooking chamber from the discharge station and wherein the discharge race includes a removable cover providing access to the cooked shrimp across the wall.

7. A cooker for cooking shrimp at atmospheric pressure, the cooker comprising:

a cooking chamber defined by a bottom floor and a top open-bottom enclosure with continuous side walls terminating at a bottom rim, the cooking chamber extending from an entrance end to an exit end;

a steam outlet for emitting steam into the cooking chamber; a water-filled trough bounding the cooking chamber with the bottom rim of the enclosure positionable at a level below the level of the water in the trough to form a first hydrostatic seal;

a water-filled feed tank disposed at the entrance end of the cooking chamber for holding a supply of uncooked shrimp;

a conveyor for transporting uncooked shrimp out of the feed tank and into the cooking chamber;

an opening at the entrance end of the cooking chamber to admit the conveyor into the cooking chamber, wherein the level of the water in the feed tank is above the level of the opening to form a second hydrostatic seal;

a covered discharge race at the exit end of the cooking chamber having a water flow into which shrimp cooked in the cooking chamber are deposited by the conveyor, wherein the discharge race includes a flap extending into the discharge flow to form a third hydrostatic seal; and a port leading from the cooking chamber and opening to the atmosphere at a vertical position at or below the vertical positions of the hydrostatic seals and having a cross section sufficient to maintain atmospheric pressure in the cooking chamber.

8. A cooker as in claim 7 wherein the trough includes an outer wall and an inner wall forming an overflow opening through which overflow water from the trough drains to the floor of the cooking chamber.

9. A cooker as in claim 8 further including water inlets at the feed tank providing water to maintain a sufficient level of water in the feed tank to maintain the second hydrostatic seal and to maintain a flow of water from the feed tank to the floor of the cooking chamber of sufficient force to prevent the warmer overflow water from the trough from flowing into the feed tank.

10. A cooker as in claim 7 wherein the port comprises a drain pipe extending downward from the bottom floor of the cooking chamber and arranged to drain condensate and other fluids from the cooking chamber through the floor.

11. A cooker as in claim 7 further comprising:

a motor disposed below the bottom floor of the cooking chamber;

a chain drivingly engaged by the motor and extending through the bottom floor into the cooking chamber to engage and drive the conveyor; and a chain guard extending downward from the floor of the cooking chamber and protectively covering a portion of the chain, wherein the chain guard forms the port.

12. A cooker as in claim 7 further comprising a lift mechanism arranged to move the enclosure between a raised position providing access to the cooking chamber and a lowered position enclosing the cooking chamber and forming the first hydrostatic seal in the trough.

13. A cooker as in claim 12 wherein the trough includes a bottom and inner and outer walls and wherein, in the lowered position, the bottom rim of the enclosure is separated from the bottom of the trough by a gap.

14. A cooker as in claim 7 further comprising a sampling device retractably extendable through the discharge race into the cooking chamber.

15. A cooker for cooking shrimp at atmospheric pressure, the cooker comprising:

a frame;

a cooking chamber supported in the frame, the cooking chamber including an upper cooking region and a largely closed bottom;

a conveyor for transporting shrimp into and through the upper cooking region;

a steam outlet to emit steam into the cooking chamber;

an enclosure having a top and side walls extending from the top to define the enclosure with an open bottom and a continuous bottom rim;

a water-filled trough bounding the cooking chamber at a vertical position below the upper cooking region and sized to receive the bottom rim of the enclosure below the level of the water in the trough, whereby a hydrostatic seal is formed between the cooking chamber and the enclosure;

a port leading from the cooking chamber and opening to the atmosphere at a vertical position below the vertical position of the hydrostatic seal at the trough and having a cross section sufficient to maintain atmospheric pressure in the cooking chamber; and an exit from the cooking chamber, wherein the exit includes a covered discharge race having a steam of flowing water carrying cooked shrimp from the cooker and a flap extending into the flowing steam to form a third hydrostatic seal at a vertical level at or above the vertical level of the port.

16. A cooker as in claim 15 wherein the port comprises a drain pipe extending downward from the bottom of the cooking chamber and arranged to drain condensate and other liquid from the bottom of the cooking chamber.

17. A cooker as in claim 15 further comprising:
a motor disposed below the bottom of the cooking chamber;
a chain drivingly engaged by the motor and extending through the bottom and into the cooking chamber to engage and drive the conveyor; and
a chain guard extending downward from the bottom of the cooking chamber and protectively covering a portion of the chain, wherein the chain guard forms the port.

18. A cooker as in claim 15 further comprising a lift mechanism arranged to move the enclosure between a raised position providing access to the cooking chamber and a lowered position enclosing the upper cooking region and forming the hydrostatic seal between the cooking chamber and the enclosure.

19. A cooker as in claim 15 further including an entrance into the cooking chamber below the bottom rim of the enclosure and a second hydrostatic seal formed at the entrance at a vertical level at or above the vertical level of the port.

20. A cooker as in claim 15 further including a sampling device that is retractably extendable into the cooking chamber through the discharge race above the flowing stream.

21. A shrimp cooker comprising:
a frame;
a cooking chamber supported in the frame and having a floor and an upper cooking region;
a steam outlet for emitting steam into the cooking chamber;
a conveyor for transporting shrimp into and through the upper cooking region of the cooking chamber;
an enclosure having a top and side walls extending from the top to define the enclosure with an open bottom and a continuous bottom rim;
a water-filled trough defined by a bottom and opposite inner and outer side walls, the trough bounding the cooking chamber at a vertical position below the upper cooking region and sized to receive the bottom rim of the enclosure; and a lift mechanism attached to the enclosure to move the enclosure between a raised position admitting service access to the cooking chamber and a lowered position covering the upper cooking region of the cooking chamber, wherein, in the lowered position, the bottom rim is below the level of the water in the trough to form a hydrostatic seal between the cooking chamber and the enclosure;
wherein the bottom rim of the enclosure in the lowered position is separated from the bottom of the trough by a gap;
wherein the lift mechanism includes a sensor that sends a signal indicating that the enclosure is in the lowered position.

22. A cooker as in claim 21 wherein the inner side wall forms an overflow opening through which overflow water from the trough drains to the floor of the cooking chamber.

23. A shrimp cooker comprising:
a frame;
a cooking chamber supported in the frame and extending from an infeed end to a discharge end;
a feed tank disposed at the infeed end of the cooking chamber for holding a supply of uncooked shrimp to be cooked in the cooking chamber;
a conveyor extending from the feed tank and through the cooking chamber for transporting uncooked shrimp out of the feed tank, into the cooking chamber, and out of the cooking chamber at the discharge end as cooked shrimp;
an enclosure sized to cover the cooking chamber;
a lift mechanism attached to the enclosure to move the enclosure between a lowered position covering the cooking chamber and a raised position admitting service access to the cooking chamber; and
a feed mechanism including a paddle for depositing uncooked shrimp held in the feed tank onto the conveyor at the infeed end at a controlled rate,
wherein the feed mechanism is mounted on the enclosure at the infeed end and is liftable along with the enclosure to the raised position admitting access to the conveyor.

24. A shrimp cooker as in claim 23 wherein the enclosure includes a pair of opposite side walls and wherein the paddle is rotatably supported at each end in opposite side walls and wherein the feed mechanism further includes a motor mounted on the outside of one of the side walls of the enclosure and coupled to the paddle to reciprocate the paddle.

25. A cooker for steam-cooking shrimp comprising:
a cooking chamber extending from an infeed end to a discharge end;
a steam outlet for emitting steam into the cooking chamber;
a conveyor for transporting uncooked shrimp from the infeed end, through the cooking chamber, and to the discharge end;
a discharge race at the discharge end of the cooking chamber having a water flow into which shrimp cooked in the cooking chamber are dropped by the conveyor, wherein the discharge race extends from a first room into a second room separated from the first room by a wall; and
a sampling device extendable through the race above the water flow from the second room into the first room.

26. A cooker as in claim 25 wherein the sampling device includes a perforated sampling tray that catches shrimp dropped from the cooking chamber by the conveyor.

27. A cooker as in claim 25 wherein the discharge race includes posts extending across the width of the race for supporting the sampling device above the water flow.

28. A cooker as in claim 25 further comprising hydrostatic seals at the infeed end and at the discharge end to prevent steam from escaping through the infeed and discharge ends.

29. A cooker as in claim 25 further comprising an enclosure covering the cooking chamber and forming a hydrostatic seal with the cooking chamber to prevent steam from escaping between the cooking chamber and the enclosure.

30. A steam cooker for continuously cooking shrimp in a saturated steam environment at 100° C. and atmospheric pressure, the cooker comprising:
a frame;

a cooking chamber supported by the frame, the cooking chamber extending from a first end to a second end and including an upper cooking region and a bottom floor;

a water-filled feed tank disposed at the first end of the cooking chamber for holding a supply of uncooked shrimp;

an infeed port between the cooking chamber and the feed tank below the level of water in the feed tank whereby a hydrostatic seal is formed at the infeed port;

an open-bottomed enclosure including a top with four side walls terminating in a bottom rim;

a water-filled trough bounding the cooking chamber;

a lift mechanism attached to the frame and to the enclosure to move the enclosure between a raised position admitting service access to the cooking chamber and a lowered position wherein the bottom rim of the enclosure resides in the trough below the level of water in the trough to form a hydrostatic seal between the enclosure and the cooking chamber;

a discharge race at the second end of the cooking chamber providing a stream of flowing water to carry cooked shrimp from the cooker;

a cover flap extending into flow stream in the discharge race to form a hydrostatic seal at the discharge race;

a conveyor extending from the feed tank through the infeed port and the upper cooking region of the cooking chamber for continuously transporting uncooked shrimp out of the feed tank and up into and through the upper cooking region of the cooking chamber wherein the shrimp are cooked and for depositing the cooked shrimp into the discharge race;

a feed mechanism including a reciprocating paddle attached to the enclosure at the first end of the cooking chamber and extending into the feed tank, the paddle being operable to sweep uncooked shrimp in the feed tank onto the conveyor at a controllable rate;

a steam supply system including a control valve and steam outlets for emitting pure saturated steam into the cooking chamber;

a thermal sensor disposed in the cooking chamber below the upper cooking region and operable with the control valve to regulate the supply of steam into the cooking chamber to maintain a steam temperature of 100° C. in the upper cooking region; and a port leading from the cooking chamber and opening to the atmosphere at a vertical position at or below the vertical positions of the hydrostatic seals and having a cross section sufficient to maintain atmospheric pressure in the cooking chamber.

* * * * *